United States Patent
Zimmermann et al.

(10) Patent No.: US 7,275,431 B2
(45) Date of Patent: Oct. 2, 2007

(54) VEHICLE MOUNTED SYSTEM FOR DETECTING OBJECTS

(75) Inventors: Uwe Zimmermann, Ludwigsburg (DE); Achim Pruksch, Neudenau (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/538,259

(22) PCT Filed: Sep. 25, 2003

(86) PCT No.: PCT/DE03/03205

§ 371 (c)(1),
(2), (4) Date: Dec. 13, 2005

(87) PCT Pub. No.: WO2004/055547

PCT Pub. Date: Jul. 1, 2004

(65) Prior Publication Data

US 2006/0137483 A1    Jun. 29, 2006

(30) Foreign Application Priority Data

Dec. 13, 2002  (DE)  ................ 102 58 287

(51) Int. Cl.
   *G01S 13/08* (2006.01)
   *G01S 13/93* (2006.01)
   *G01S 13/94* (2006.01)
(52) U.S. Cl. .................... 73/510; 342/70; 342/75; 342/126
(58) Field of Classification Search ............... 73/866.1, 73/488, 510, 511; 342/29, 69, 70, 73, 74, 342/81, 126
   See application file for complete search history.

(56) References Cited

U.S. PATENT DOCUMENTS

| | | | | |
|---|---|---|---|---|
| 3,493,920 | A | * | 2/1970 | MacMunn ................... 367/96 |
| 3,749,197 | A | * | 7/1973 | Deutsch ..................... 180/169 |
| 4,920,520 | A | * | 4/1990 | Gobel et al. ................. 367/99 |
| 5,877,849 | A | * | 3/1999 | Ramer et al. .............. 356/3.01 |
| 5,955,967 | A | * | 9/1999 | Yamada ..................... 340/904 |

(Continued)

FOREIGN PATENT DOCUMENTS

| | | |
|---|---|---|
| DE | 19858129 | 6/1999 |
| DE | 199 49 409 | 4/2001 |
| EP | 0811855 | 12/1997 |

OTHER PUBLICATIONS

Kunert, M.: "Radarbasierte Nahfeldsensorik zur Precrash Sensierung," (Radar-based Near-field Sensor System for Pre-crash Sensing), Innovativer KFZ-Insassen-und Partnerschutz. Tagung Berlin, Sep. 30-Oct. 1, 1999, VDI Berichte 1471, Duesseldof; VDI Verlag GmbH, DE, Bd. 471, Sep. 30, 1999, pp. 169-185.

*Primary Examiner*—Hezron Williams
*Assistant Examiner*—David A. Rogers
(74) *Attorney, Agent, or Firm*—Kenyon & Kenyon LLP

(57) ABSTRACT

A method for object detection using vehicle-mounted sensors is provided, the sensing ranges of which sensors overlap at least partially. In this context, signals of at least two sensors having sensing ranges with essentially identical coverage, and additional signals of at least one additional sensor having a sensing range which only partially overlaps with the sensing ranges of the at least two sensors, are evaluated. An object is identified as relevant when it is detected by at least three of the sensors.

7 Claims, 2 Drawing Sheets

U.S. PATENT DOCUMENTS

| | | | |
|---|---|---|---|
| 6,055,042 A * | 4/2000 | Sarangapani | 356/4.01 |
| 6,097,476 A * | 8/2000 | Kato et al. | 356/4.01 |
| 6,128,576 A * | 10/2000 | Nishimoto et al. | 701/301 |
| 6,163,252 A * | 12/2000 | Nishiwaki | 340/435 |
| 6,169,572 B1 * | 1/2001 | Sogawa | 348/113 |
| 6,215,415 B1 * | 4/2001 | Schroder | 340/932.2 |
| 6,246,357 B1 * | 6/2001 | Uehara | 342/70 |
| 6,384,718 B1 * | 5/2002 | Nass et al. | 340/435 |
| 6,522,288 B1 * | 2/2003 | Paradie et al. | 342/145 |
| 6,628,227 B1 * | 9/2003 | Rao et al. | 342/70 |
| 6,664,918 B2 * | 12/2003 | Paradie et al. | 342/70 |
| 6,727,844 B1 * | 4/2004 | Zimmermann et al. | 342/70 |
| 6,784,791 B2 * | 8/2004 | Rao et al. | 340/435 |
| 6,853,908 B2 * | 2/2005 | Andersson et al. | 701/207 |
| 6,873,251 B2 * | 3/2005 | Schiffmann et al. | 340/436 |
| 6,919,917 B1 * | 7/2005 | Janssen | 348/143 |
| 2003/0060956 A1 * | 3/2003 | Rao et al. | 701/45 |

* cited by examiner

PRIOR ART

VEHICLE MOUNTED SYSTEM FOR DETECTING OBJECTS

FIELD OF THE INVENTION

The present invention relates to a method and a device for detecting an object.

BACKGROUND INFORMATION

A method for object detection having at least two distance-determining sensors attached to a motor vehicle, the detection regions at least partially overlapping and relative positions of possible detected objects with respect to the sensors in the overlap region being determined according to the triangulation principle, is described in German Patent Application DE 199 49 409. Possible apparent objects resulting from object determination are identified in this process via dynamic object monitoring. Such known methods for determining the position of objects use the distance lists of similar individual sensors as input quantities. In this context, similar means that these individual sensors have the same aperture angle. The maximum horizontal sensing range of typical sensors of this type is +/−55 degrees, for example. Therefore, at a distance of approximately 14 m, each sensor covers a region of approximately +/−6 m in the lateral direction. This means that numerous interfering objects on the road edge, such as trees, bushes, or posts, are sensed in addition to relevant objects, such as traffic members. Moreover, significant measurement data need to be determined, such that a plurality of reflection centers may be detected even for relevant objects, so that it is not ensured that every sensor is detecting the same reflection center. As a result of these facts, it is not ensured for all traffic situations that relevant and interfering objects are able to be clearly identified even when using more than two sensors. It is also possible for objects to be displayed at incorrect positions.

SUMMARY

The present invention provides an object detection method that is capable of increasing the reliability. The improved ability to differentiate between relevant objects and interfering objects allows the position of relevant objects to be determined even more precisely. In addition, the concentration of at least one sensor on the particular road region makes it possible to increase the coverage while maintaining the same radiated power.

DETAILED DESCRIPTION

Figure 1:
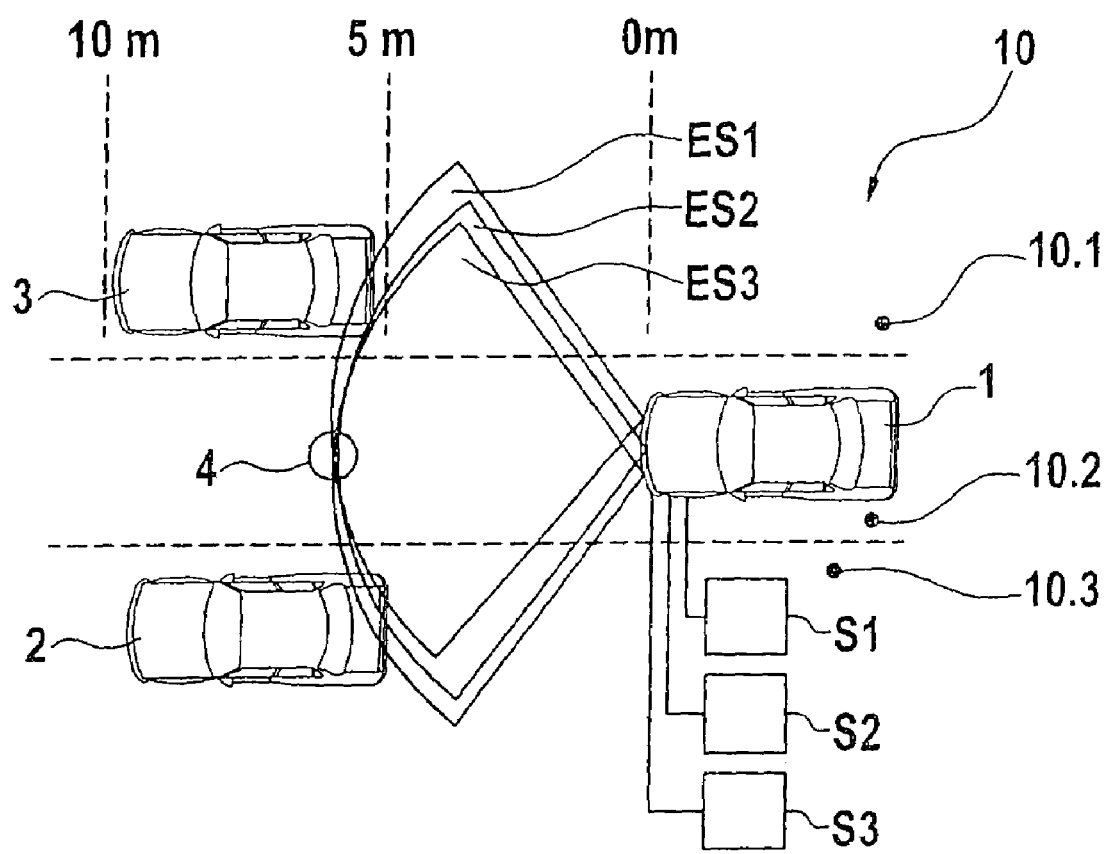
FIG. 1 shows use of the conventional object detection method for a traffic situation on a roadway having a plurality of lanes.

A conventional method, including its disadvantages, is explained on the basis of FIG. 1. Shown is a traffic situation on a roadway 10, which includes a plurality of lanes 10.1, 10.2, 10.3. Particular vehicle 1 travels in center lane 10.2 and approaches two other vehicles 3 and 4 traveling in the same direction in adjacent lanes 10.1 and 10.3. Vehicle 1 is equipped with distance sensors S1, S2, S3, the at least partially overlapping sensing ranges of which sensors are designated as ES1, ES2, ES3. Under particularly unfavorable conditions, the detection of different reflection centers may result in the system as a whole displaying a non-existent apparent target in addition to vehicles 2 and 3. Such an apparent target appears to be in region 4, i.e., in lane 10.2 of vehicle 1. The edge regions of sensing ranges ES1, ES2, ES3 overlap in region 4. Such a result clearly leads to a false reaction of the system, i.e., the vehicle would react with a braking operation. This would result in significant uncertainty on the part of the driver of vehicle 1 since the driver, trusting the system display, erroneously believes that an obstacle is located in front of own vehicle 1 in own lane 10.2 of roadway 10 in region 4. As soon as the driver determines that this is a system error, trust in the system reliability may be lost.

Figure 2:
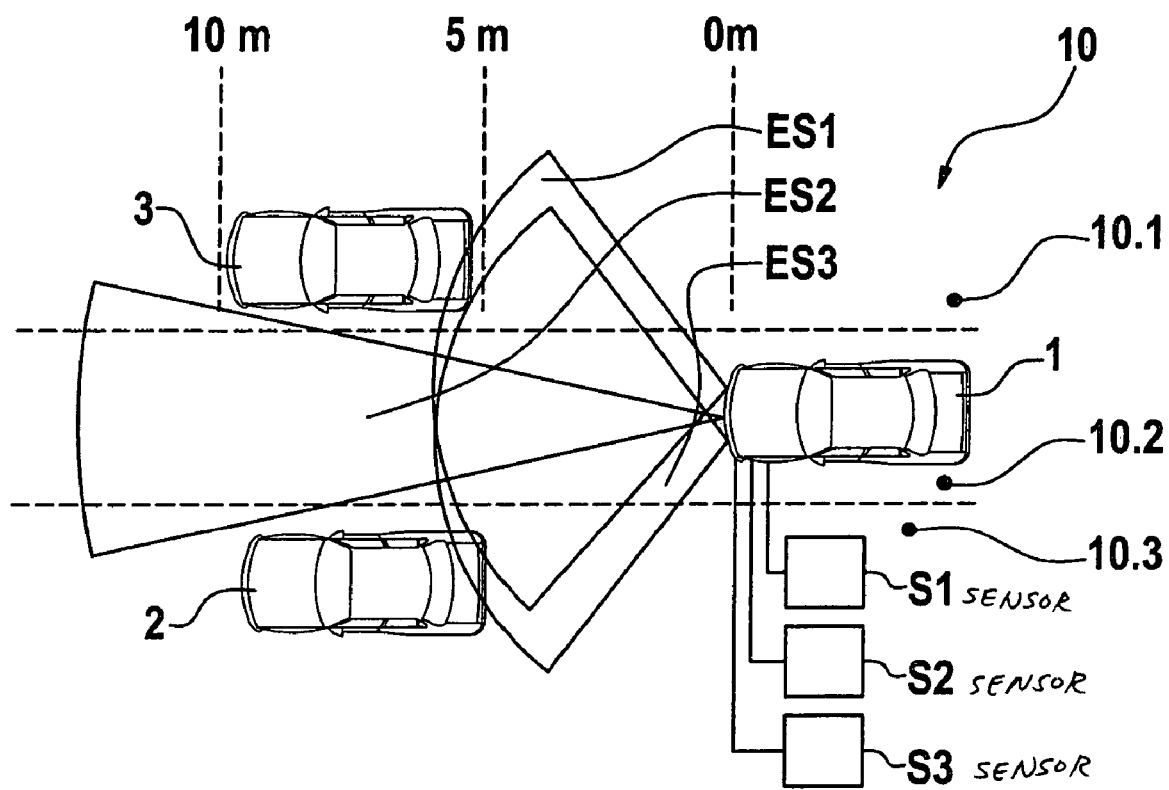
FIG. 2 shows use of an example embodiment of the method of the present invention for a traffic situation on a roadway having a plurality of lanes.

The method according the present invention is explained on the basis of FIG. 2. Shown is a traffic situation comparable to that in FIG. 1. On a roadway 10, including a plurality of lanes 10.1, 10.2, 10.3, vehicle 1 travels in center lane 10.2 and approaches two other vehicles 3 and 4 traveling in the same direction in adjacent lanes 10.1 and 10.3. Vehicle 1 is equipped with distance sensors S1, S2, S3, the at least partially overlapping sensing ranges of which sensors are designated as ES1, ES2, ES3. At least two sensors, namely sensors S1, S3, are positioned at the front of the vehicle, essentially in one plane. A third sensor S2 is also positioned at the vehicle front between sensors S1 and S3. Sensing ranges ES1 and ES3 of sensors S and S3 largely overlap. Their angular expansion on a horizontal plane is approximately +/−55°, for example. This means that at a distance of approximately 14 m from the front of vehicle 1, each sensor S1, S3 having sensing range ES1 ES3 in the lateral direction covers a region of approximately +/−6 m. Therefore, in the case of multi-lane roadway 10 shown in FIG. 2, at least partial regions of adjacent lanes 10.1 and 10.3 are covered in addition to own lane 10.2. In the case of a narrower road having, for example, only one lane for each direction, sensing ranges ES1, ES3 of sensors S1, S3 would sense the edges of the road and obstacles present there, in addition to the adjacent lane. According to the present invention, at least one sensor S2 has a sensing range ES2, the angular expansion of which is significantly less than that of sensing ranges ES1 and ES3. The angular expansion of sensing range ES2 may be so small that essentially only own lane 10.2 is covered for the maximum sensing range, as shown in FIG. 2. Such a limitation of the horizontal sensing range of sensor S2 allows a selection of relevant object reflections to be made under the assumption that objects outside own lane 10.2, i.e., vehicles 2 and 3 in lanes 10.1 and 10.3, are no longer detected by sensor S2. An object is generated or triangulated when it is detected by at least two sensors. If the point of intersection of the sensing ranges of sensors S1 and S3 are in sensing range ES2 of sensor S2 but sensor S2 does not detect an object, no object is generated in sensing range ES2. The result is that the distance values detected by sensors S1 and S3 cannot be from the same object. Accordingly, only objects detected by sensors S1, S3 as well as by sensor S2 are viewed as relevant targets. These are almost exclusively objects located in own lane 10.2. In the traffic situation shown in FIG. 2, no object to be classified as relevant would be displayed according to this approach. Even the representation of an apparent target may be effectively suppressed even under particularly unfavorable conditions.

As a result of the possible focusing of the beam of sensor 2, its sensing range ES2, as shown in FIG. 2, may extend significantly farther in the travel direction of vehicle 2 than sensing ranges ES1 and ES3 of sensors S1, S3. This is possible without increasing the radiated power. The focusing may be performed via correspondingly dimensioned optical elements, such as lenses, positioned in the beam path. Since greater sensing range ES2 of sensor S2 in the travel direction of vehicle 2 allows early selective sensing of objects located in own lane 10.2, a triangulation and/or tracking algorithm provided in the system or a filter method may be advantageously preconditioned. This results in a time savings that contributes to an increase in safety particularly in critical situations.

In an advantageous further embodiment of the present invention, sensing ranges ES1 and ES3 of sensors S1, S3, which are responsible for the peripheral regions, may be further adjusted such that as few non-relevant objects as possible are detected. Therefore, the sensing coverage of sensing ranges ES1 and ES3 may be shortened such that vehicles approaching own lane 10.2 may be detected early but far away objects on the road edge are no longer detected. The sensing range in the immediate vicinity of vehicle 2 is not significantly affected by the described measures so that parking operations continue to be reliably supported.

The solution of the present invention may be implemented in an essentially cost-neutral manner since already available standard sensors may be adapted accordingly. A sensor functioning in another frequency range, e.g. 77 GHz band, already proven in an ACC. system (ACC=Automatic Cruise Control) may be used in some instances for sensor S2. In an advantageous further embodiment of the present invention, the sensing angle and/or sensing coverage of sensing range ES2 of sensor 2 is/are adaptable to the particular road conditions such that an optimal adjustment to the road type and the dependent width of the existing lanes results. As a result, sensing range ES3 may be optimally adapted to roadways having only a singe lane or a plurality of lanes. This adjustment may be performed manually by the driver who operates a corresponding switch having a plurality of switch positions when entering a certain road category, e.g., when merging onto a highway. However, in a particularly advantageous manner, sensing range ES2 may also be automatically adapted to the road category, e.g., via coupling with a navigation system provided in vehicle 2 or via a GPS system. As soon as the navigation system determines that a certain road type is being driven on, a corresponding adjustment signal is sent to the system for determining the position of objects.

In a further advantageous embodiment of the present invention, such an adjustment of sensing range ES2 is performed by the system for determining the position of objects in that the signals of sensors S1 and S3, which are responsible for the peripheral regions, are evaluated accordingly. If for example these sensors sense a large number of objects in their sensing ranges, it may be derived that the particular sensing range extends too far beyond the edge region of the road. The width of the sensing range would then be able to be reduced automatically.

What is claimed is:

1. A vehicle-mounted system for detecting an object, comprising:
    a first sensor and a second sensor positioned at one longitudinal end of a vehicle, the first sensor and the second sensor being in essentially a single plane; and
    a third sensor positioned at the one longitudinal end of the vehicle, the third sensor having a sensing angle that is smaller than sensing angles of the first sensor and the second sensor;
    wherein a detected object is determined as being relevant if the detected object is detected by at least the first sensor, the second sensor and the third sensor,
    wherein a sensing range of the first sensor and the second sensor are substantially coincident,
    wherein the sensing angles of the first sensor and the second sensor are between +/−50 degrees and +/−60 degrees,
    wherein the sensing angle of the third sensor is changeable so as to be adapted to the width of a road lane, and
    wherein the sensing angle of the third sensor is changeable by a control signal derived from sensing signals of the first, second and third sensors.

2. The system as recited in claim 1, wherein the sensing angle of the third sensor is changeable by one of a manual switch command and an automatic device.

3. The system as recited in claim 1, wherein the sensing angle of the third sensor is changeable by a control signal of a navigation system.

4. A vehicle-mounted system for detecting an object, comprising:
    a first sensor and a second sensor positioned at one longitudinal end of a vehicle, the first sensor and the second sensor being in essentially a single plane; and
    a third sensor positioned at the one longitudinal end of the vehicle, the third sensor having a sensing angle that is smaller than sensing angles of the first sensor and the second sensor;
    wherein a detected object is determined as being relevant if the detected object is detected by at least the first sensor, the second sensor and the third sensor,
    wherein a sensing range of the first sensor and the second sensor are substantially coincident,
    wherein the sensing angle of the third sensor is configured to be changeable, and
    wherein the sensing angle of the third sensor is changeable by a control signal derived from sensing signals of the first, second and third sensors.

5. The system as recited in claim 4, wherein the sensing angle of the third sensor is changed so as to be adapted to the width of a road lane.

6. The system as recited in claim 4, wherein the sensing angle of the third sensor is changeable by one of a manual switch command and an automatic device.

7. The system as recited in claim 4, wherein the sensing angle of the third sensor is changeable by a control signal of a navigation system.

* * * * *